United States Patent [19]

Wank et al.

[11] Patent Number: 5,055,345
[45] Date of Patent: Oct. 8, 1991

[54] MULTILAYER COMPOSITE MATERIAL

[75] Inventors: Joachim Wank, Dormagen; Walter Uerdingen, Leverkusen; Lutz Schrader, Krefeld; Werner Waldenrath, Colonge, all of Fed. Rep. of Germany

[73] Assignee: Bayer Aktiengesellschaft, Leverkusen Bayerwerk, Fed. Rep. of Germany

[21] Appl. No.: 482,425

[22] Filed: Feb. 20, 1990

[30] Foreign Application Priority Data

Feb. 24, 1989 [DE] Fed. Rep. of Germany ....... 3905790

[51] Int. Cl.$^5$ .................. B32B 27/10; B29C 51/14; B29L 7/00
[52] U.S. Cl. .................. 428/215; 428/412; 428/423.1; 428/916; 428/40; 428/900
[58] Field of Search .................. 428/215, 412, 423.1, 428/916

[56] References Cited

U.S. PATENT DOCUMENTS

| | | | |
|---|---|---|---|
| 4,337,333 | 6/1982 | Reiff et al. | 528/67 |
| 4,389,472 | 6/1983 | Neuhaus et al. | 430/10 |
| 4,788,102 | 9/1988 | Koning et al. | 428/916 X |
| 4,835,064 | 5/1989 | Vates et al. | 428/916 X |

FOREIGN PATENT DOCUMENTS 8910260 11/1989 World Int. Prop. O. .

OTHER PUBLICATIONS

Abstract of JP A-63 194 949.

*Primary Examiner*—P. C. Sluby
*Attorney, Agent, or Firm*—Joseph C. Gil; Aron Preis

[57] ABSTRACT

A 0.3 to 2 mm thick multilayer composite material comprising the following layers:

1st layer: 0.01 to 0.3 mm thick highly transparent thermoplastic
2nd layer: 5 to 50 $\mu$m thick decorative ink layer and/or 5 to 50 $\mu$m thick adhesive layer
3rd layer: 0.05 to 0.5 mm thick thermoplastic containing 0.1 to 30% by weight pigment
4th layer: 0.05 to 0.8 mm thick highly elastic plastic containing up to 30% by weight pigment
5th layer: 0.05 to 0.5 mm thick thermoplastic containing 0.1 to 30% by weight pigment
6th layer: 5 to 50 $\mu$m decorative ink layer and/or 5 to 50 $\mu$m thick adhesive layer
7th layer: 0.01 to 0.3 mm thick highly transparent thermoplastic is disclosed layers 3 and 5 being optional.

6 Claims, No Drawings

MULTILAYER COMPOSITE MATERIAL

This invention relates to a 0.3 to 2 mm thick multilayer composite material comprising the following layers:

1st layer: 0.01 to 0.3 mm thick highly transparent thermoplastic
2nd layer: 5 to 50 μm thick decorative ink layer and/or 5 to 50 μm thick adhesive layer
3rd layer: 0.05 to 0.5 mm thick thermoplastic containing 0.1 to 30% by weight pigment
4th layer: 0.05 to 0.8 mm thick highly elastic plastic containing up to 30% by weight pigment
5th layer: 0.05 to 0.5 mm thick thermoplastic containing 0.1 to 30% by weight pigment
6th Layer: 5 to 50 μm decorative ink layer and/or 5 to 50 μm thick adhesive layer
7th layer: 0.01 to 0.3 mm thick highly transparent thermoplastic,
layers 3 and 5 being optional.

The multilayer composite materials according to the invention are preferably used for the production of credit cards and identity cards.

Layers 1 and 7 may consist, for example, of the following plastics: aromatic polycarbonates, preferably those having molecular weights $\overline{M}w$ in the range from 25,000 to 200,000 and preferably in the range from 30,000 to 120,000, linear polyarylene sulfones having average molecular weights $\overline{M}w$ in the range from 15,000 to 50,000 (cf. DE-AS 30 10 143), thermoplastic cellulose esters obtained in known manner by esterification of cellulose with aliphatic monocarboxylic anhydrides, for example acetic and butyne anhydride or acetic and propionic anhydride. Suitable cellulose esters generally contain a certain number of hydroxyl groups and are bleached by oxidation (cf. DE-OS 37 19 879). Polyvinyl chloride, for example the commercial transparent types. Styrene/acrylonitrile copolymers, for example having molecular weights $\overline{M}w$ in the range from 10,000 to 600,000. Polyalkylene terephthalates, for example commercially available polyethylene terephthalates. Thermoplastic ABS (acrylonitrile-butadiene-styrene) graft copolymers, for example mixtures of 50 to 70% graft product and 95 to 30% by weight thermoplastic styrene/acrylonitrile copolymers. Graft products are the reaction products of the polymerization of, for example, styrene and acrylonitrile in the presence of a rubber. These products are generally obtained by emulsion polymerization and contain from 5 to 80% by weight rubber. The rubber used may be polybutadiene, natural rubber, butadiene/acrylonitrile copolymer, butadiene/styrene copolymers, acrylate polymers, vinyl ether polymers, EPDM (ethylene-propylene diene monomer) terpolymers. ABS graft polymers are known and are described, for example, in Ullmanns Encyclopädie der technischen Chemie, Vol. 19, pages 277 et seq. and the literature described therein. Polyolefins and polyamides are also suitable. For layers 1 and 7, the thermoplastics must of course be clearly transparent.

Layers 3 and 5 may consist of the same thermoplastics, but additionally contain pigments. They serve as supports for the decorative ink layers 2 and 6. In some cases, layers 3 and 5 may also be left out. In that case, however, the decorative layer must be directly applied to layer 4.

For layers 3 and 5, the thermoplastics do not of course have to be transparent. Accordingly, there is a greater choice.

Layers 2 and 6 may be ink layers of commercially available screen or offset printing inks based on acrylates, PVC, cellulose esters or mixtures thereof. They may also consist of UV-crosslinkable acrylate inks containing pigments and/or dyes. Depending on the nature of layers 3 and 5, it may also be necessary additionally to provide an adhesive layer. The adhesive layer may be based on polyacrylate with or without crosslinking agents (isocyanates, epoxy resin, polyurethane resin). Particularly suitable decorative ink layers are those based on polyurethane.

For the production of suitable decorative polyurethane ink layers 2 and 6, it is possible to use both aqueous, drying dispersions of preferably linear polyester polyurethanes and also drying organic solutions of preferably linear polyester polyurethanes optionally containing a polyisocyanate of relatively high functionality as cross-linking agent to which corresponding colorants and, optionally, thickeners such as, for example, methyl cellulose are added. Suitable polyurethane dispersions are, for example, those based on linear polyester diols, aromatic or aliphatic diisocyanates and, optionally, the usual chain-extending agents which have been prepared using ionic synthesis components in accordance with the teaching of U.S. Pat. No. 3,479,310 or DE-AS 14 95 847. The aqueous dispersions of preferably linear polyester polyurethanes containing carboxylate and sulfonate groups obtainable in accordance with DE-OS 28 04 609 are also eminently suitable. Where organic solutions of preferably linear polyester polyurethanes are used, solutions of nonionic linear polyester polyurethanes in suitable solvents are preferred. These polyurethanes are preferably reaction products of (i) aromatic isocyanates, such as 2,4- and/or 2,6-diisocyanatotoluene, 4,4′-diisocyanatodiphenyl methane, hexamethylene diisocyanate, isophorone diisocyanate, 1,5-diisocyanatonaphthalene or mixtures thereof with (ii) polyester diols having a molecular weight ($\overline{M}w$) in the range from 1,000 to 4,000, more especially based on adipic acid and suitable glycols, such as ethylene glycol, 1,4-dihydroxybutane, 1,6-dihydroxyhexane and mixtures thereof and, optionally, (iii) chain-extending agents, for example the glycols just mentioned, the reactants being used in an NCO:OH equivalent ratio of 0.9:1 to 1.1:1 and preferably 0.95:1 to 1:1 and 0.1 to 2 mol chain extender or chain extender mixture optionally being used per mol polyester diol. Suitable solvents for polyester polyurethanes of this type are, for example, ethyl acetate, butyl acetate, methyl ethyl ketone, methyl isobutyl ketone or mixtures of such solvents. The dispersions or solutions are generally used with a solids content of 10 to 40% by weight. In many cases, it can be of advantage to incorporate small amounts of a polyisocyanate of relatively high functionality, for example tris(6-isocyanatohexyl)-biuret, in the solutions mentioned to improve the mechanical properties of the polyurethane films ultimately obtained. Where the decorative ink layer based on the described polyurethanes—suitable in accordance with the invention—is used, there is no need for a further adhesive layer because this decorative ink layer also performs the function of an adhesive under the effect of temperature and pressure. The temperature is preferably in the range from 110° to 130° C. and the pressure preferably in the range from 2 to 10 bar.

The intermediate layers 2 and 6 may be applied either by offset printing or by gravure printing or by screen printing.

The optional adhesive layers 2 and 6 are applied to the decorative ink layers 3 and 5 by screen printing or by roll coater.

Where polyurethanes are used as the resin base, the intermediate layers 2 and 6 are thermoplastic layers completely tack-free at room temperature. Where other decorative ink layers are used, the adhesive layers which have to be used in that case are not tack-free at room temperature.

In the context of the invention, screen printing is understood to be the forcing of inks or paints through a screen cloth stretched over a frame, of which the meshes are partly closed, depending on the original. The remaining openings in the screen cloth correspond to the pattern to be printed.

Offset printing is an indirect printing process in which the carrier of the pattern to be printed, for example aluminium or zinc plates, are coated with ink over the raised areas and the layer of ink is transferred to the substrate to be decorated by means of a rubber blanket in the case of flat-bed machines or by means of rollers in the case of roller offset machines (literature: Brockhaus Encyclopedia 1955, Vol. 8, page 530).

The thickness of the ink layer is between 5 and 50 $\mu$m.

The highly elastic layer 4 preferably consists of thermoplastic polyurethane having a Shore A hardness in the range from 80 to 90 and a Shore D hardness in the range from 50 to 70. The shear modulus of the highly flexible thermoplastic polyurethanes suitable for use in accordance with the invention is in the range from $10^3$ to $10^1$ MPa at $-60°$ to $+160°$ C.

These particularly suitable thermoplastic polyurethanes may be prepared from polyester, polyether and polyether carbonate urethanes.

Suitable polyether urethanes are prepared in accordance with DE-PS 23 02 564. Suitable polyester urethanes may be obtained in accordance with DE-OS 28 42 806. Suitable polyether carbonate urethanes are prepared in accordance with DE-OS 22 48 372.

To produce the multilayer composite materials according to the invention, layers 3 and 5 are applied to a film of the constituent material of layer 4 either by applying preformed films of the corresponding material by lamination or by forming a layer by casting, knife coating or co-extrusion. Layers 2 and 6 are then applied to the crude sheet thus obtained by printing processes, as already described. Finally, layers 1 and 7 are applied at elevated temperatures, preferably by pressing on corresponding preformed films. The production of such films is known (cf. for example DE-OS 25 17 033, DE-OS 25 31 240). The films in question may be polished on both sides or polished on one side with a matt finish on the other side. These films for layers 1 and 7 preferably consist of polycarbonates, polyalkylene terephthalate, PVC, (polyvinylchloride) cellulose esters or SAN (styrene-acrylonitrile).

The films for layers 3 and 5 preferably consist of polycarbonates or of mixtures of polycarbonates with ABS, polyalkylene terephthalate or thermoplastic polyurethane.

EXAMPLE 1

A 250 $\mu$m thick film of polyether carbonate urethane having a Shore A hardness of 85 and a shear modulus at 20° C. of $8.10^0$ MPa is coated on both sides with a melt of an aromatic polycarbonate based on bisphenol A ($\eta_{rel}=1.31$, as measured in $CH_2Cl_2$ at 25° C. and at a concentration of 0.5 g/100 ml) by extrusion coating and the composite material is taken off via cooling rollers. The die gap of the slot die for the polycarbonate melt is adjusted in such a way that the thickness of the polycarbonate layer is 200 $\mu$m for a take-off speed of 10 m/minute. The polycarbonate starting material contains 15% $TiO_2$ as pigment.

The decorative pattern is applied to both sides of the three-layer film thus produced by screen printing using a screen printing ink based on an aqueous polyurethane dispersion.

The composite film thus decorated is laminated on both sides with a 0.05 mm thick, highly transparent aromatic polycarbonate film ($\eta_{rel}=1.32$, as measured in $CH_2Cl_2$ at 25° C. and 0.5 g/100 ml) by placing the decorated composite film between two layers of the highly transparent polycarbonate film (one of these polycarbonate films may be provided with a magnetic strip) and mold-pressing the whole at 110° C. under a specific pressure of 2 bar.

The credit card blanks are punched out from this composite in known manner.

The identification and code are embossed in known manner in standard automatic embossing machines.

The credit card thus produced has a curvature of <0.5 mm, a heat resistance of >100° C. and a dynamic flexural fatigue strength of >100,000 cycles.

EXAMPLE 2

Production of a composite in accordance with Example 1 using a 0.4 mm thick film of thermoplastic polyester polyurethane having a Shore D hardness of 60 and a shear modulus at 100° C. of $2.10^1$ MPa.

This thermoplastic polyurethane film is coated as in Example 1 with a blend of 60 parts by weight aromatic polycarbonate and 40 parts by weight polybutylene terephthalate having pigment content of 10%, so that the composite has a total thickness of 650 $\mu$m.

This composite film is coated on both sides with UV-crosslinkable inks by offset printing and subsequently coated with free acrylate adhesives containing OH groups, to which an equivalent quantity of an aliphatic isocyanate has been added. The film thus coated with adhesive is laminated on both sides with a 50 $\mu$m thick film of biaxially stretched PETP (polyethylene terephthalate) film, one of the PETP films containing a magnetic strip. The film is further processed as in Example 1.

After embossing, the card has a curvature of <0.5 mm, a heat resistance of 120° C. and a dynamic flexural fatigue strength of >100,000 cycles.

EXAMPLE 3

A 0.4 mm thick film of a polyester urethane film (Shore A hardness 85) pigmented with 20% $TiO_2$ is corona-treated on both sides and then printed by screen printing with the preferred screen printing inks according to the invention based on aliphatic polyester urethanes. The film thus decorated is laminated on both sides with a 0.2 mm thick highly transparent film of aromatic polycarbonate by hot press molding in accordance with Example 1. One of the polycarbonate films is provided with a magnetic strip.

Further processing is carried out as in Example 1. The credit card thus produced has a curvature after embossing of <0.5 mm, a heat resistance of >100 and a flexural fatigue strength of >100,000 cycles.

We claim:

1. A 0.3 to 2 mm thick multilayer composite material comprising the following layers:
1st layer: 0.01 to 0.3 mm thick transparent thermoplastic polymer layer,
2nd layer: 5 to 50 μm thick decorative ink layer and/or 5 to 50 μm thick adhesive layer,
3rd layer: 0.05 to 0.5 mm thick thermoplastic polymer layer containing 0.1 to 30% by weight pigment,
4th layer: 0.05 to 0.8 mm thick thermoplastic polyurethane layer having a Shore A hardness of 80 to 90 and a Shore D hardness of 50 to 70 and a shear modulus of 10 to 1000 MPa at −60° to +160° C. containing up to 30% by weight pigment,
5th layer: 0.05 to 0.5 mm thick thermoplastic polymer layer containing 0.1 to 30% by weight pigment,
6th layer: 5 to 50 μm decorative ink layer and/or 5 to 50 μm thick adhesive layer, and
7th layer: 0.01 to 0.3 mm thick transparent thermoplastic polymer layer, layers 3 and 5 being optional.

2. A composite material as claimed in claim 1 in which layer 4 consists of polyether carbonate/polyester urethane or polyether urethane.

3. A multilayered composite material comprising five layers wherein a first and fifth layers are transparent and consist of at least one thermoplastic resin selected from the group consisting of aromatic polycarbonate, linear polyarylene sulfone, cellulose ester, polyvinyl chloride, styrene/acrylonitrile copolymer, polyalkylene terephthalate, ABS graft copolymer, graft products of styrene and acrylonitrile in the presence of a rubber, polyolefin and polyamide, and a second and fourth layers each consisting of a decorative ink layer and/or an adhesive layer, and a third layer consisting of a thermoplastic polyurethane having a Shore A hardness of 80 to 90 and a Shore D hardness of 50 to 70 and a shear modulus of 10 to 1000 MPa at −60° to +160° C., and wherein said first and fifth layers independently are 0.01 to 0.3 mm thick, and said second and fourth layers independently are 5 to 50 μm thick and said third layer is 0.05 to 0.8 mm thick, said composite material having a thickness of 0.3 to 2 mm.

4. The composite material of claim 3 wherein said third layer further comprises up to 30 percent by weight of a pigment.

5. The composite material of claim 4 wherein said pigment is $TiO_2$.

6. The composite material of claim 5 wherein dynamic flexural fatigue strength is more than 100,000 cycles.

* * * * *